United States Patent Office.

JOHN WILLIAM GOODSON, OF MORRISBURG, ONTARIO, CANADA.

REMEDY FOR PILES.

SPECIFICATION forming part of Letters Patent No. 348,278, dated August 31, 1886.

Application filed January 2, 1886. Serial No. 187,410. (No specimens.) Patented in Canada February 8, 1886, No. 23,378.

*To all whom it may concern:*

Be it known that I, JOHN WILLIAM GOODSON, of the village of Morrisburg, county of Dundas, in the Province of Ontario and Dominion of Canada, a subject of Her Majesty Queen Victoria, have invented a new and useful Composition of Matter to be Used for the Treatment of Piles, of which the following is a specification.

My composition consists of the following ingredients, combined in the proportions stated, viz: four ounces sweet or lard oil; two ounces oil of cedar; one dram of opium; one dram tincture of arnica.

The above ingredients are to be thoroughly mingled by agitation.

In using the above-named composition in severe cases the parts affected should be well bathed in warm water and the composition applied with a camel's-hair brush, the finger, or a sponge. In ordinary cases the bathing may be dispensed with, and the composition in all cases to be applied three or four times daily until a cure is effected.

I am aware that certain compositions are made and published in "Gunn's Works on the Practice of Medicine," but none of the said compositions are composed of the same ingredients together, and of the same quantities, nor are they used for the same purpose; but I am not aware that any composition of ingredients in proportions stated have been used together.

What I claim, and desire to secure by Letters Patent of the United States, is—

The composition composed of lard-oil or sweet-oil, oil of cedar, opium, and tincture of arnica, in the proportions specified.

Morrisburg, December 28, 1885.

JOHN WILLIAM GOODSON.

Witnesses:
EDWARD AULT,
C. A. MYERS.